US012198528B2

(12) United States Patent
Else et al.

(10) Patent No.: US 12,198,528 B2
(45) Date of Patent: Jan. 14, 2025

(54) ALARM SYSTEM FACIAL RECOGNITION

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 84 days.

(21) Appl. No.: 18/146,808

(22) Filed: Dec. 27, 2022

(65) Prior Publication Data

US 2024/0212476 A1 Jun. 27, 2024

(51) Int. Cl.

*G08B 21/22* (2006.01)
*G06V 20/52* (2022.01)
*G06V 40/16* (2022.01)

(52) U.S. Cl.

CPC ............. *G08B 21/22* (2013.01); *G06V 20/52* (2022.01); *G06V 40/172* (2022.01); *G06V 40/174* (2022.01)

(58) Field of Classification Search

CPC ...... G08B 21/22; G06V 40/174; G06V 20/52; G06V 40/172

See application file for complete search history.

(56) References Cited

U.S. PATENT DOCUMENTS 10,243,979 B2 3/2019 Poder et al.
10,257,469 B2 4/2019 Edwards et al.
10,922,547 B1 2/2021 Siminoff et al.
10,997,809 B2 5/2021 Petkov et al.
2018/0048864 A1 2/2018 Taylor et al.
2018/0247504 A1 8/2018 Siminoff et al.
2018/0350213 A1* 12/2018 Bart ....................... H04N 7/186
2019/0147676 A1* 5/2019 Madzhunkov ......... H04N 23/10 340/5.2
2019/0166473 A1* 5/2019 Venkatraman ......... G08G 1/202
2019/0213816 A1* 7/2019 Grigorov ............. G06V 40/174
2019/0347916 A1* 11/2019 Wild ................... H04L 67/1095
2020/0211343 A1 7/2020 Mullins
2020/0249752 A1* 8/2020 Parshionikar ........... G06F 3/016

(Continued)

FOREIGN PATENT DOCUMENTS

WO 2018039083 A1 3/2018

OTHER PUBLICATIONS

International Search Report and Written Opinion dated Mar. 5, 2024 for International Application No. PCT/US2023/085798 filed Dec. 22, 2023, consisting of 11 pages.

*Primary Examiner* — Thomas D Alunkal
(74) *Attorney, Agent, or Firm* — Weisberg I.P. Law, P.A.

(57) ABSTRACT

A premises device associated with a premises security system includes a three-dimensional (3D) depth sensor and a camera and processing circuitry in communication with the camera and the 3D depth sensor. The processing circuitry in the premises device generates a two-dimensional (2D) template of a face based on an image captured by the camera. The 2D template indicates a facial characteristic associated with the person's face. A 3D mapping of the facial characteristic is generated using data from the 3D depth sensor. At least one of an emotional state or facial gesture is determined based on the 3D mapping. The premises security system performs a security action based on the at least one of the determined emotional state or facial gesture.

18 Claims, 7 Drawing Sheets

START

Generate a two-dimensional (2D) template of a face based on an image captured by the camera, the 2D template indicating a facial characteristic associated with the face;
S100

Generate a 3D mapping of the facial characteristic using data from the 3D depth sensor
S102

Determine at least one of an emotional state or a facial gesture based on the 3D mapping
S104

Perform a premises security system action in response to the at least one of the facial emotional state or the facial gesture
S106

END

(56) References Cited

U.S. PATENT DOCUMENTS

| | | | |
|---|---|---|---|
| 2020/0296328 | A1 | 9/2020 | Siminoff et al. |
| 2020/0313923 | A1* | 10/2020 | Choudhary ........... G06F 3/0488 |
| 2021/0089040 | A1 | 3/2021 | Ebrahimi Afrouzi et al. |
| 2021/0158681 | A1 | 5/2021 | Horrocks et al. |
| 2021/0207429 | A1 | 7/2021 | Kim et al. |
| 2021/0241606 | A1 | 8/2021 | Kinney et al. |

* cited by examiner

ALARM SYSTEM FACIAL RECOGNITION

TECHNICAL FIELD

The present disclosure relates to facial recognition using two-dimensional (2D) camera and a three-dimensional (3D) depth sensor to determine a facial emotional state and/or facial gesture of a detected person and perform at least one premises security system action based on the determined facial emotional state and/or gesture.

BACKGROUND

Typically, security systems use a standard keypad to arm and disarm the system. By inputting user codes, a user can either arm or disarm the security system. A problem with this method is that the user is required to remember 4-digit or longer numerical user's codes, which has led to numerous false alarms due to user forgetting the codes or entering numerical codes in the wrong sequence multiple times. Secondary devices, such as key fobs and radio frequency identification (RFID) tags, have been used to attempt to alleviate the problems with keypads. However, these secondary devices are susceptible to being lost or stolen.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
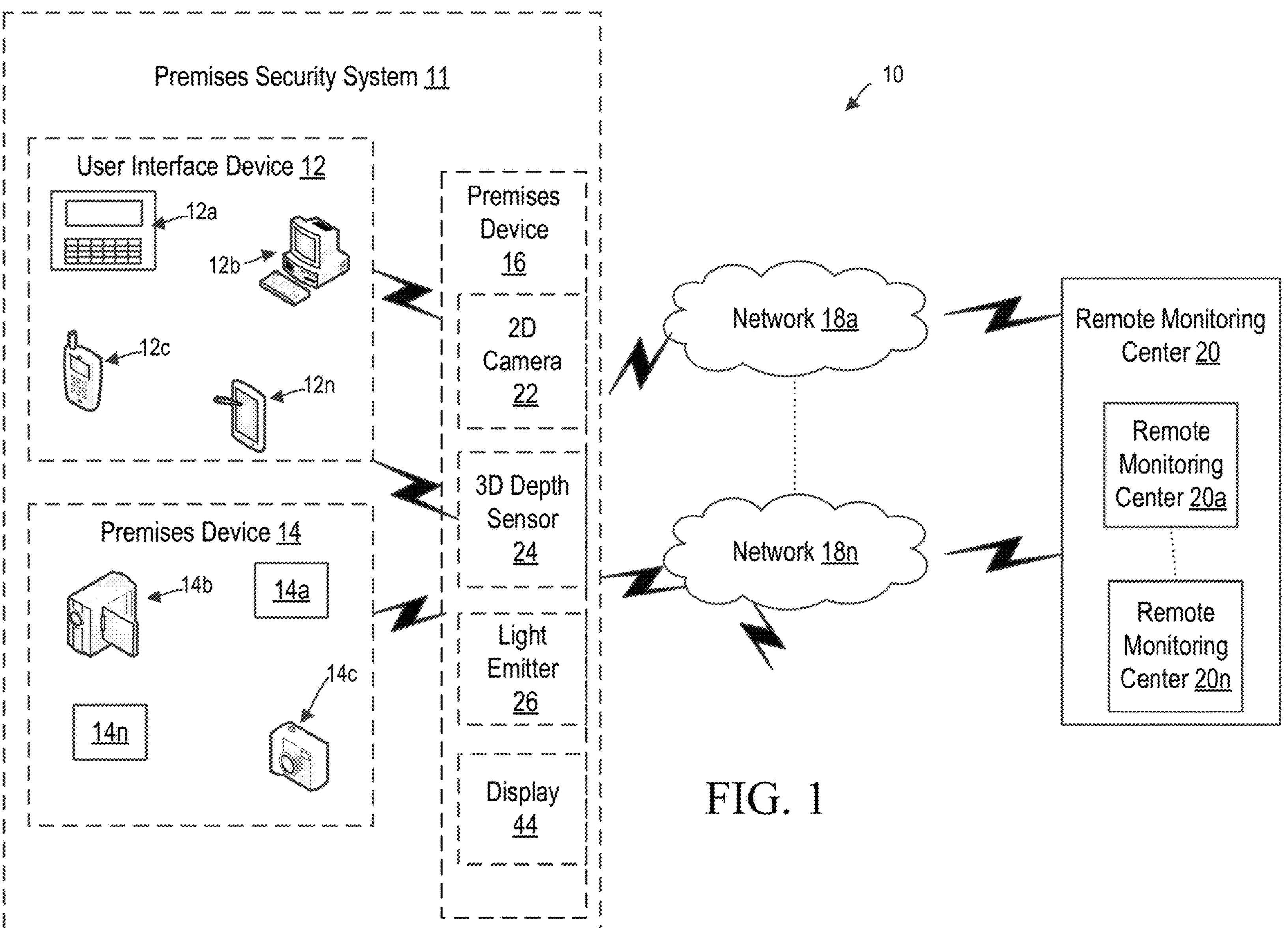
FIG. 1 is a block diagram of an example premises security system in accordance with various embodiments of the present disclosure.

Before describing in detail exemplary embodiments, it is noted that the embodiments may reside in combinations of apparatus components and processing steps related to using a two-dimensional (2D) camera and a three-dimensional (3D) depth sensor to determine a facial emotional state and/or facial gesture of a detected person and perform at least one premises security system action based on the determined facial emotional state and/or gesture. By incorporating a 2D camera sensor and 3D depth sensor into the security system along with computer-based pattern recognition techniques, embodiments in accordance with the present disclosure can provide more secure systems relative to systems that use merely traditional 4-digit codes. Embodiments of the present disclosure may also facilitate management of user credentials.

In the present disclosure, components may be represented by conventional symbols in the drawings, focusing on specific details that may facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designators refer to like elements there is shown in FIG. 1 a system designated generally as "10." System 10 may include premises security system 11 where premises security system 11 includes and/or is associated with one or more user interface devices **12*a* to 12*n* (collectively referred to as "user interface device 12"), one or more premises devices 14***a* to 14*n* (collectively referred to as "premises device 14"), and premises device 16. System 10 may further include one or more networks 18*a* to 18*n* (collectively referred to as "network 18"), and one or more remote monitoring centers 20*a* to 20*n* (collectively referred to as "remote monitoring center 20"), communicating with each other or with at least one other entity in system 10.

User interface device 12 may be a device, such as a wired or wireless device, which allows a user to communicate with premises device 16. User interface device 12 may be a portable control keypad/interface 12*a*, computer 12*b*, mobile phone 12*c* and tablet 12*n*, among other devices that allow a user to interface with premises device 16 and/or one or more premises devices 14. User interface device 12 may communicate at least with premises device 16 using one or more wired and/or wireless communication protocols. For example, portable control keypad 12*a* may communicate with premises device 16 via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, and/or through user interface device 12.

Premises devices 14 may include one or more types of sensors, control and/or image capture devices. For example, a single premises device 14 may include multiple image capture devices (e.g., several digital camera devices pointed at different angles, generating multiple respective video, image, and/or audio streams contained within a single premises device 14). For example, the types of sensors may include various safety related sensors such as motion sensors, fire sensors, carbon monoxide sensors, flooding sensors and contact sensors, among other sensor types that are known in the art. The premise devices 14 may include, for example, one or more lifestyle (e.g., home automation) related devices configured to adjust at least one premises setting, such as lighting, temperature, energy usage, door lock and power settings, among other settings associated with the premises or devices on the premises. Image capture devices may include a digital camera and/or video camera, among other image captures devices that are well known in the art. Premises device 14 may communicate with premises device 16 via proprietary wireless communication protocols and may also use Wi-Fi. Other communication technologies can also be used, and the use of Wi-Fi is merely an example. Various additional sensors and control and/or image capture devices may relate to life safety or lifestyle depending on both what the sensors, control and image capture devices do and how these sensors, control and image devices are used by system 10.

Premises device 16 may provide one or more of management functions, image/video stitching functions, image and/or video analysis functions, control functions such as power management, premises device management and alarm management/analysis, among other functions to premises security system 11. In particular, premises device 16 may manage one or more life safety and life style features. Life safety features may correspond to security system functions and settings associated with premises conditions that may result in life threatening harm to a person such as carbon monoxide detection and intrusion detection. Lifestyle features may correspond to security system functions and settings associated with video capturing devices and non-life-threatening conditions of the premises such as lighting and thermostat functions. In one or more embodiments, premises device 16 may include one or more displays 44, as described herein. Premises device 16 includes a two-dimensional (2D) camera 22. The camera 22 may be embedded in the display 44 and configured to generate a 2D template of a person's face based on at least one image captured by the camera 22. The 2D template may indicate at least one facial characteristic associated with the person's face. Premises device 16 also includes 3D depth sensor 24 which may generate a 3D mapping of the at least one facial characteristic. Premises device 16 may further include light emitter 26 which projects structured light, such as onto a person's face. The structured light may be in a grid or dot matrix format to facilitate generate the 3D mapping. The camera 22 and/or 3D depth sensor 24 output may be transmitted to the remote monitoring center 20 and/or other entity in system 10 for further analysis.

Premises device 16 may communicate with network 18 via one or more communication links. In particular, the communications links may be broadband communication links such as a wired cable modem or Ethernet communication link, and digital cellular communication link, e.g., long term evolution (LTE) and/or 5G based link, among other broadband communication links. Broadband as used herein may refer to a communication link other than a plain old telephone service (POTS) line. Ethernet communication link may be an IEEE 802.3 or 802.11 based communication link. Network 18 may be a wide area network, local area network, wireless local network and/or metropolitan area network, among other networks known in the art. Network 18 provides communications between premises device 16 and remote monitoring center 20. In one or more embodiments, premises device 16 may be part of premises device 14 or user interface device 12. In one or more embodiments, premises device 16 is part of remote monitoring center 20 or may be network cloud implemented logical devices.

While premises device 16 is illustrated as being a separate device from user interface device 12 and premises device 14, in one or more embodiments, premises device 16 may be integrated with one or more user interface devices 12 and/or premises devices 14 and/or other device located at premises associated with premises security system 11.

Non-limiting example implementations, in accordance with one or more embodiments, of premises device 16 discussed in the preceding paragraphs will now be described with reference to FIG. 2.

The system 10 includes a premises device 16 that includes hardware 28 enabling the premises device 16 to communicate with one or more entities in system 10 and to perform one or more functions described herein. The hardware 28 may include a communication interface 30 for setting up and maintaining at least a wired and/or wireless connection to one or more entities in system 10 such as remote monitoring center 20, premises device 14, user interface device 12, etc. The premises device 16 hardware 28 includes camera 22, 3D depth sensor 24, light emitter 26 and display 44.

In the embodiment shown, the hardware 28 of the premises device 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors, processor cores, field programmable gate arrays (FPGAs), and/or application specific integrated circuits (ASICs) adapted to execute software and/or firmware based, e.g., embedded firmware instructions. The processor 36 may be configured to access (e.g., write to and/or read from) the memory 38, which may comprise any kind of volatile and/or nonvolatile memory, e.g., cache and/or buffer memory and/or random access memory (RAM), read-only memory (ROM), optical memory, and/or erasable programmable read-only memory (EPROM).

The premises device 16 further has software 40 stored internally in, for example, memory 38, or stored in external memory (e.g., database, storage array, network storage device, etc.) accessible by the premises device 16 via an external connection. The software 40 may be executable by the processing circuitry 34. The processing circuitry 34 may be configured to control any of the methods and/or processes described herein and/or to cause such methods, and/or processes to be performed, e.g., by premises device 16. Processor 36 corresponds to one or more processors 36 for performing premises device 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to premises device 16. For example, processing circuitry 34 of the premises device 16 may include emotion and gesture detection unit 42 which is configured to perform one or more premises device 16 functions described herein such as with respect to emotion and gesture recognition determinations, authentication and/or other training phase based actions. In another example, processing circuitry 34 of the premises device 16 may include emotion and gesture detection unit 42 which is configured to determine at least one of a facial emotional state and a facial gesture of the person's face based on a 3D mapping and perform a premises security system 11 action based on the determined at least one of the facial emotional state and a facial gesture.

Figure 2:
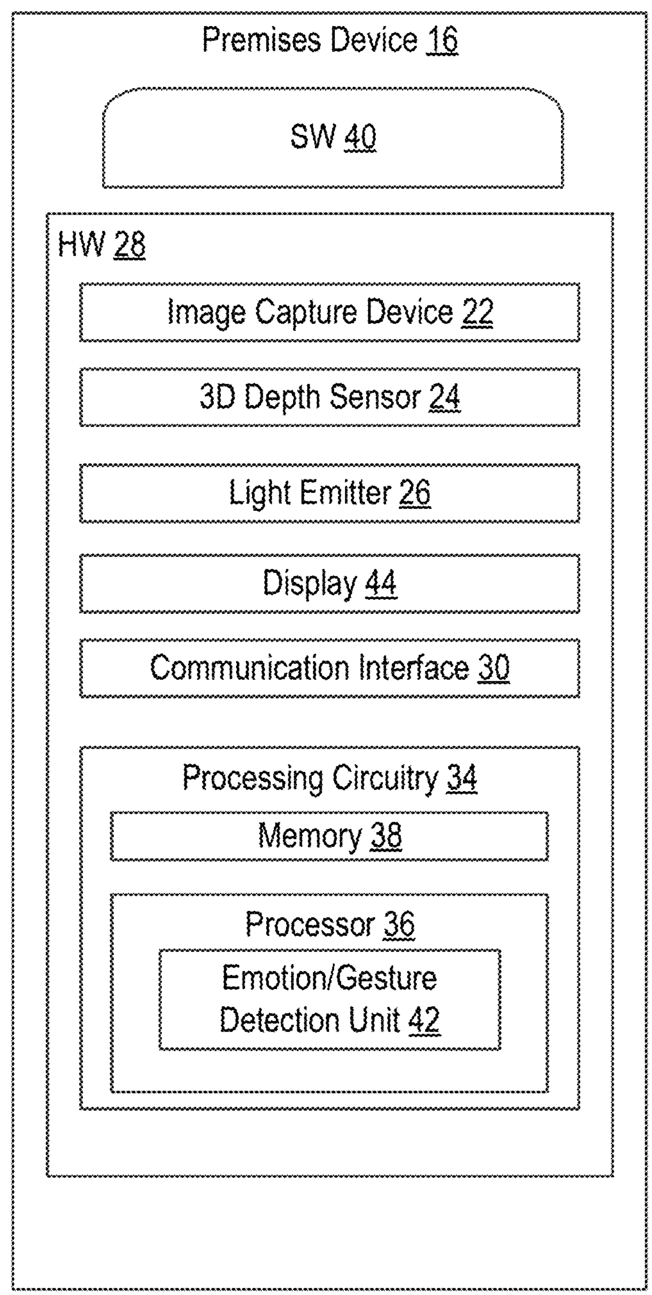
FIG. 2 is a block diagram of an example premises device for a premises security system in accordance with various embodiments of the present disclosure.

Although FIG. 2 shows emotion and gesture detection unit 42 as being within a particular processor, this unit may be implemented such that a portion of the unit is stored in a corresponding memory within the processing circuitry. In other words, the gesture detection unit 42 may be implemented in hardware or in a combination of hardware and software within the processing circuitry. Further, while premises device 16 is described as including an emotion and gesture detection unit 42 for determining, for example, at least one of a facial emotional state and a facial gesture of the person's face based on a 3D mapping, one or more of these functions may alternatively be performed by a remote server in network 18, remote monitoring center 20, cloud network and/or by another device in communication with premises security system 11 via network 18.

Figure 3:
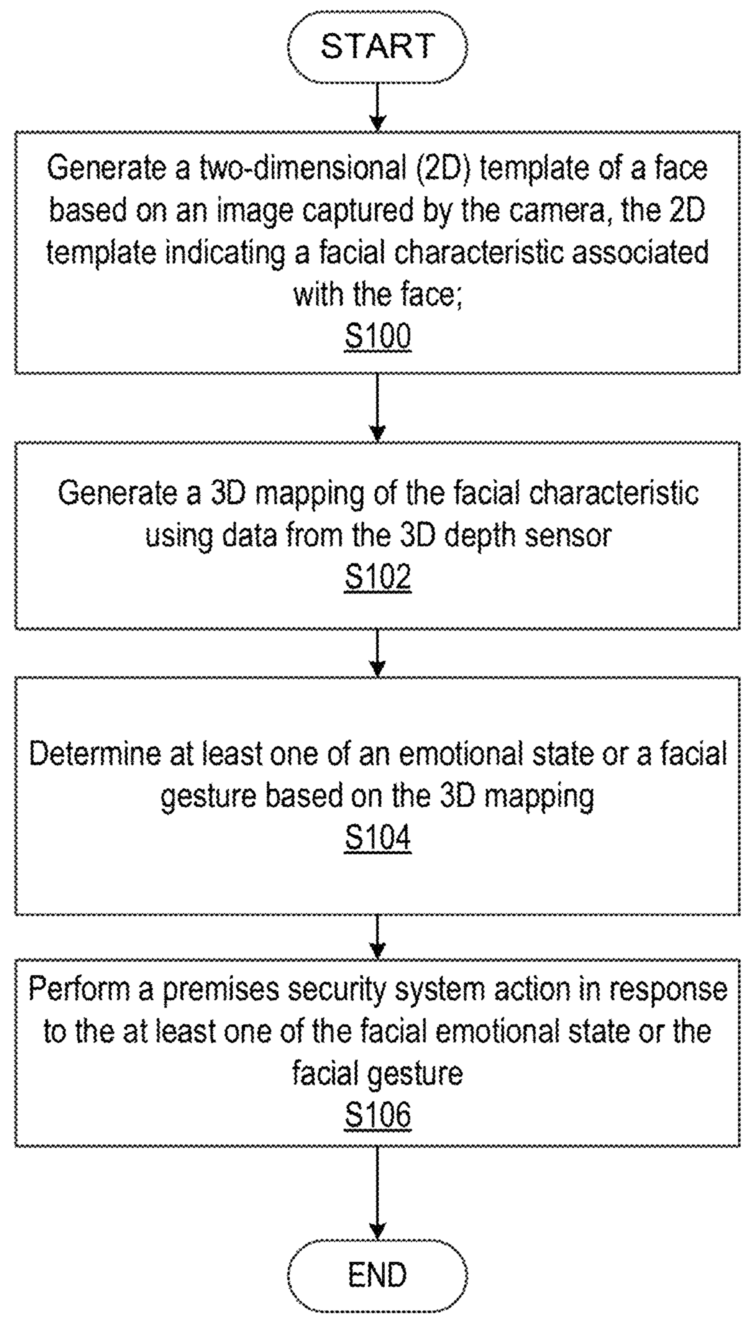
FIG. 3 is a flowchart of a method for operating a premises device for a premises security system in accordance with various embodiments of the disclosure.

FIG. 3 is a flowchart that illustrates a method for operating a premises device 16 for a premises security system 11 in accordance with various embodiments of the disclosure. One or more blocks described herein may be performed by one or more elements of premises device 16, such as by one or more of camera 22, 3D depth sensor 24, light emitter 26, processing circuitry 34 (including emotion and gesture detection unit 42), processor 36, etc. Accordingly, premises device 16 is configured to generate (Block S100) a two-dimensional (2D) template of a face based on an image captured by the camera 22, the 2D template indicating a facial characteristic associated with the face. Premises device 16 is configured to generate (Block S102) a 3D mapping of the facial characteristic using data from the 3D depth sensor 24. Premises device 16 is configured to determine (Block S104) at least one of an emotional state or a facial gesture based on the 3D mapping. Premises device 16 is configured to perform (Block S106) a premises security system action in response to the at least one of the facial emotional state or the facial gesture.

According to one or more embodiments, the premises device 16 further comprises a light emitter 26 that projects structured light in a grid or dot matrix format, and the processing circuitry 34 is further configured to generate the 3D mapping based on the structed light projected onto the face. Further, in one or more embodiments, the light emitter 26 is an infrared light emitter.

According to one or more embodiments, the processing circuitry 34 is further configured to authenticate a user by comparing the 3D mapping of the face to a stored 3D mapping associated with an authorized user.

According to one or more embodiments, the three-dimensional depth sensor 24 is a time-of-flight sensor.

According to one or more embodiments, the processing circuitry 34 is further configured to determine the facial characteristic based on pixel information. Further, in one or more embodiments, the premises device 16 is a control panel of the premises security system 11. According to one or more embodiments, the premises security system 11 action comprises arming or disarming the premises security system 11; locking or unlocking a door; unlocking a display 44 of the premises device 16; or initiating a call to customer service. In one or more embodiments, the three-dimensional depth sensor 24 and/or camera 22 are further configured to rotate. In one or more embodiments, the processing circuitry 34 is further configured to use the camera 22 and/or the three-dimensional depth sensor 24 to detect an environmental event occurring in an environment of the premises device 16.

Figure 4:
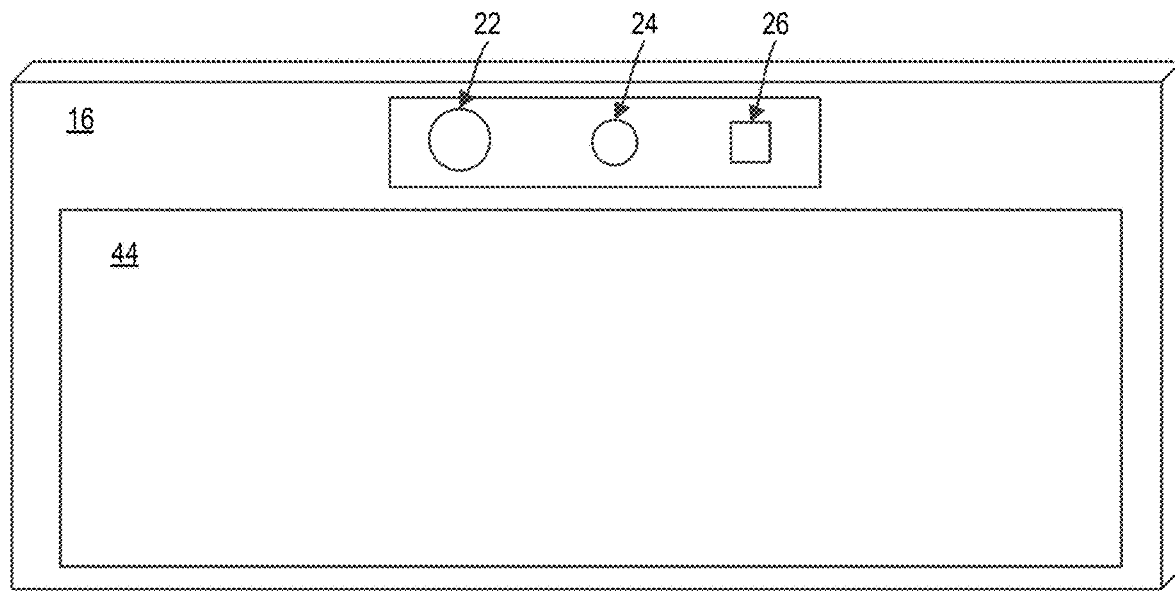
FIG. 4 is an illustration of an example premises device for a premises security system constructed in accordance with various embodiments of the disclosure.

FIG. 4 is an illustration of a premises device 16 for a premises security system 11 constructed in accordance with various embodiments of the disclosure. The premises security system 11 has a built in a 2D camera 22, 3D depth sensor 24 and light emitter 26. Embodiments described herein may provide robust, advanced user input and control methods for arming and disarming a security system 10. By incorporating a 2D camera 22 and 3D depth sensor 24, for example, a time-of-flight sensor, into a premises security system 11 and using computer-based pattern recognition techniques, facial recognition can be utilized to secure a premises in a more secure manner than traditional code based methods. Various embodiments may be beneficial in that they reduce or eliminate false alarms due to user input errors, forgotten user codes and/or entry in the wrong numerical sequence. The embodiments described herein may reduce the need for a user to have a master code reset by calling customer service, eliminate the need for less secure 4-digit codes and remove the need for various components, such as key pads, from the premises security system 11.

Embodiments may detect a user's unique facial features to authenticate the user and to arm and disarm his or her security system 11. Embodiments of the present disclosure can be used in conjunction with other technologies, such as dual authentication, and be used in to perform a variety of functions. For example, embodiments may be used to unlock a premises security system 11, such as by unlocking a display 44. Embodiments may also be used in a customer service video chat directly from a display 44 of a user interface device 12 or premises device 16 to quickly identify an end user to a customer service agent while contemporaneously pulling up relevant account information for the call center agent.

Embodiments may provide for gesture control of a user interface thereby providing hands-free operation. For example, camera 22 and depth sensor 24 can be used to sense a gesture of a person, such as a hand wave or wink, and cause premises security system 11 to perform a security action, such as disarming the system 11 or initiating an alarm.

Embodiments may also be used in conjunction with virtual assistants to perform functions such as: arming/disarming premises security system 11; establishing or bypassing specified security zones; calling customer service directly from a premises device 16 display 44; pulling up account information directly on a premises device 16 display 44; enabling bill pay; unlocking and locking doors without a personal identification number (PIN); closing or opening garage doors without a PIN.

In some embodiments, the camera 22 and processing circuitry 34 may use facial recognition to create a template of a user's facial features that indicate the relative positions and/or shape of the user's eyes, nose, cheekbones and jaw. The 3D depth sensor 24 may provide a 3D mapping of the user's face and provide depth information of features obtained by a light emitter 26 projecting structured light onto the user's face. The light emitter 26 may be arranged to create structured light in a grid or dot matrix format. In some embodiments, light emitter 26 is an array of light sources that are invisible to the human eye, such as in the 940 nm wavelength provided by infrared or laser diodes. However, if laser diodes are used, a protection circuit may be used to avoid damage to human eyes.

As discussed herein, using secure facial recognition technology from a security system 10 panel, in combination with 3D sensing methods, may provide a user input and control method for arming and disarming the security system 10 that may be simpler for users as compared with code or fob based systems, while reducing or eliminating false alarms due to user input errors, forgotten user codes and/or lost secondary authentication devices. Embodiments of the present disclosure can also displace keypads as the main user input method. As a result, in various embodiments, the user's unique facial features become a credential for arming and disarming their premises security system 11. Benefits of the arrangements described herein may include increased security, better user credential management and added additional features not delivered by prior art security systems.

Details regarding examples for user enrollment and user/non-user actions associated with the detection of a person, as well as an example process for alarm event actions are described below.

Figure 5:
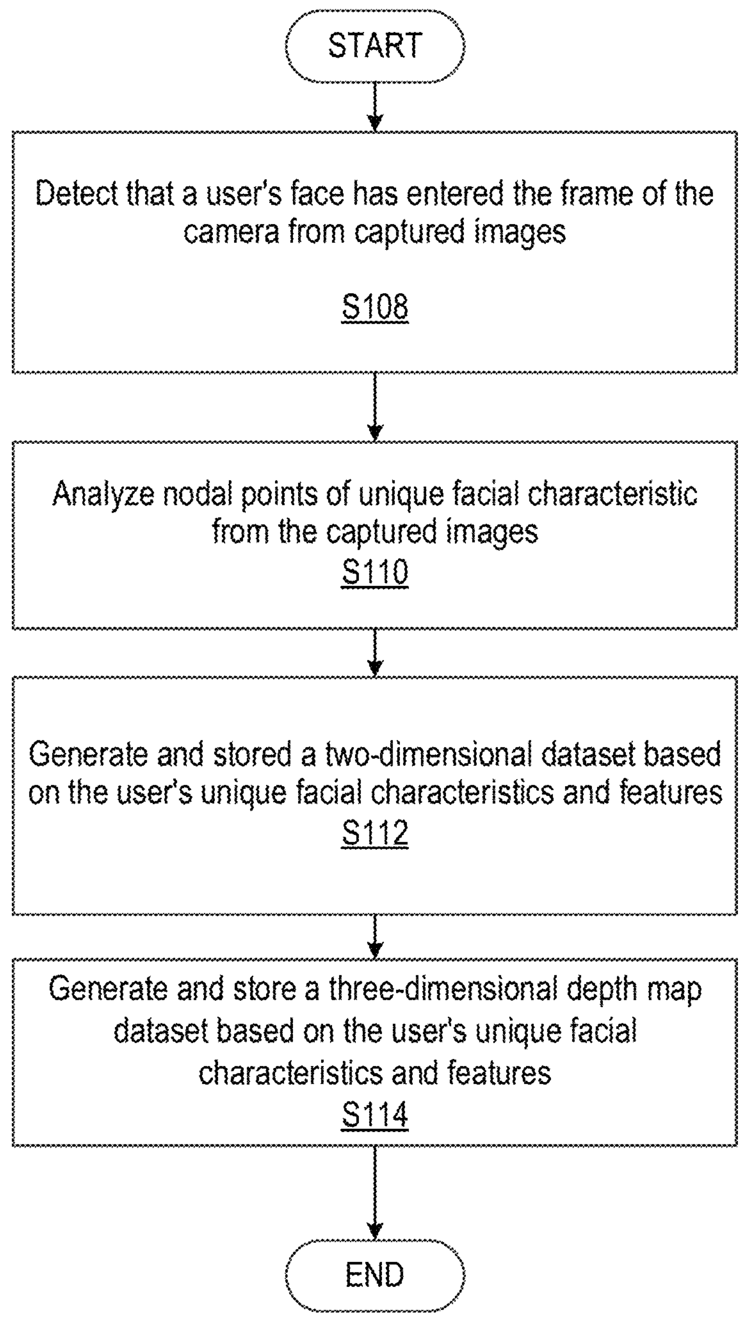
FIG. 5 is a flow chart of a user defined system enrollment function in accordance with various embodiments of the disclosure.

FIG. 5 is a flow chart of an example user defined system enrollment function in accordance with various embodiments of the disclosure. In such embodiments, the facial scan may activate upon the user standing in front of the security apparatus, such as premises device 16, in which the 2D camera 22 detects and analyzes a user's face upon the user entering the camera 22 lens field of view. In some embodiments, a user's face is detected (Block S108) that has entered the frame of the 2D camera 22 which captures multiple, e.g., up to six, images to measure pitch and roll at various angles of features associated with the person's face. In some embodiments, up to 256 nodal points of unique facial characteristic from the six captured images may be analyzed (Block S110). Greater than 256 nodal points can also be analyzed. A two-dimensional template of the user's face may then be generated (Block S112) by 2D camera 22 which maps the user's facial characteristics to the up to desired number, e.g., 256, nodal points. Facial features such as eyes, nose, mouth, and shape of the user's unique facial curvatures may be stored in a memory, such as memory 38 of premises device 16, as a user's database profile. Multiple instances of the user's face can be measured to offset for varying angles in which the user's face can be detected, such as pitch and roll.

An optical sensor and combined light emitter, such as 3D depth sensor 24, may measure aspects of the user's distinctive facial features such as contour of the eye socket, nose, mouth, and chin. For example, a three-dimensional depth map dataset based on the user's unique facial characteristics and features may be generated and stored in a memory, such as memory 38 of premises device 16 (Block S114). In some embodiments, the measurement by 3D depth sensor 24 is performed simultaneously with the capture and measurements of/by 2D camera 22.

In some embodiments, the infrared light emitter 26 may create a structured light matrix over the user's face, and the optical sensor in 3D depth sensor 24 may measure characteristics such as distance between each of the nodal points and generate a three-dimensional mapping of the user face. This 2D and 3D information may be combined through post processing and deep learning of the attributes of both the two-dimensional and three-dimensional profiles to create user authenticated profiles for the arm/disarm functionality of the security system 10.

Figure 6:
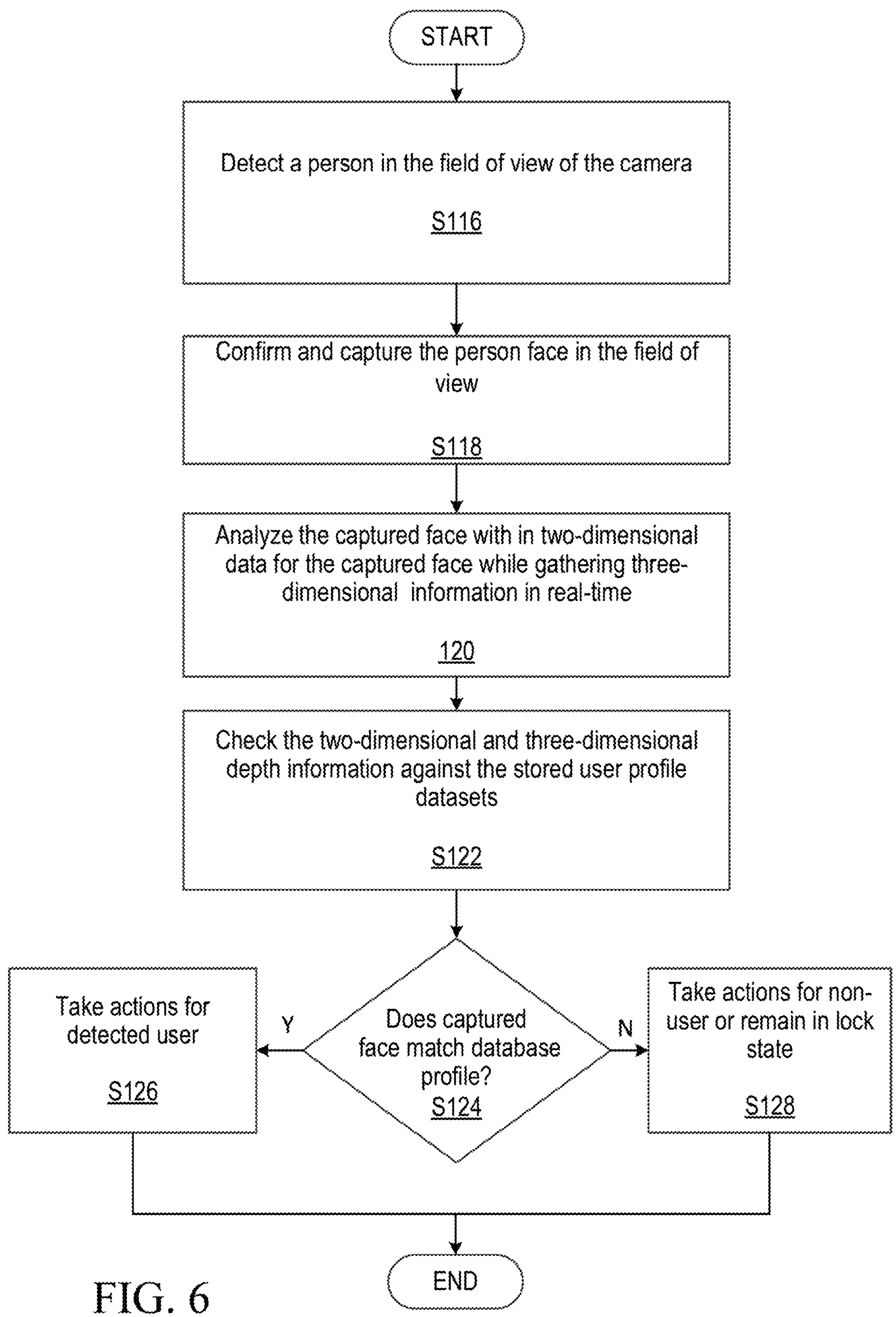
FIG. 6 is a flow chart of the enabling of user and/or non-user actions in accordance with various embodiments of the disclosure.

FIG. 6 is a flow chart of an example process for using the 2D camera 22 and 3D depth sensor 24 to identify a person as a user or non-user. When a person approaches or enters the field-of-view of the 2D camera 22 in the premises device 16, the 2D camera 22 detects (Block S116) the person and triggers a face detection procedure. Once a face has been confirmed in the camera's field-of-view (Block S118), the two-dimensional information for the captured face image may be analyzed (Block S120) while also gathering three-dimensional information in real-time. The two-dimensional and three-dimensional information may then be checked (Block S122) against two-dimensional and three-dimensional dataset references stored in user profiles in memory 38 (discussed with reference to FIG. 5) to determine (Block S124) if the captured datasets for the face match any stored user profiles.

If the face matches the two-dimensional and three-dimensional datasets of a stored user profile, then the premises security system 11 may take (Block S126) one or more user detected actions. These actions may include but are not limited to unlocking the user interface (UI), enabling gesture control, personal messaging, or arming/disarming actions. If the face does not match a user dataset profile, the premises security system 11 will conclude that the person is not an authorized user and may take (Block S128) other non-user actions such as those defined by an authorized user. These non-user actions may include, but are not limited to, locking the UI, notification that a person is not an authorized user or other actions as defined by an authorized user.

Figure 7:
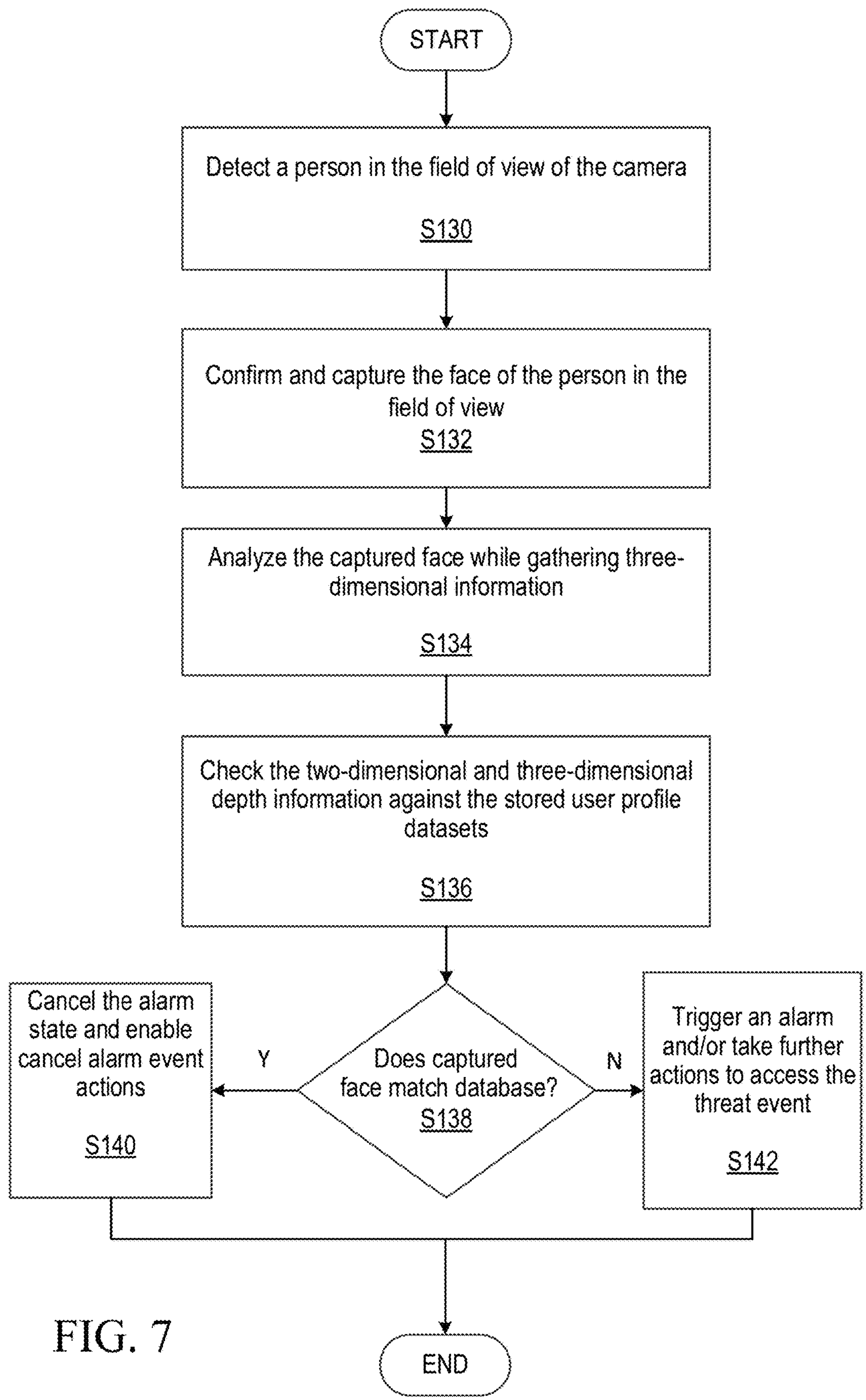
FIG. 7 is a flow chart of the enabling of alarm event actions in accordance with various embodiments of the disclosure.

FIG. 7 is a flow chart of an example process for alarm event actions. In some embodiments, if the premises security system 11 is in an active alarm mode, the premises security system 11 may run an alarm determination routine. In accordance with the routine, when a person approaches or enters the field-of-view of the 2D camera 22 in the premises device 16, the 2D camera 22 detects (Block S130) the person and triggers a face detection procedure. Once a face has been confirmed in the field-of-view of camera 22 (Block S132), the two-dimensional information for the captured face image may be analyzed (Block S134) while gathering three-dimensional information in real-time. The two-dimensional and three-dimensional information may then be checked (Block S136) against two-dimensional and three-dimensional dataset references stored in user profiles in memory 38 (discussed above with reference to FIG. 5) to determine (Block S138) if the captured datasets for the face match stored user profiles.

If the detected face matches an approved user profile, the premises security system 11 may cancel (Block S140) the alarm state and enable cancel alarm event actions. If the user does not match a user profile during an active alarm event, then the premises security system 11 may trigger (Block S142) an alarm and/or may take further action to access the threat such as attempt to validate the face and possibly check the face against database applications such local or federal registries. If a match is obtained, information about the match may be sent to the remote monitoring center 20 for emergency personnel dispatch.

It is noted that the processes for 2D image capture and processing, and 3D sensor capture and evaluation in the processes described with reference to FIGS. 6 and 7, can be the same as the processes described with reference to FIG. 5, with a difference being that the information captured and derived from the processes in FIG. 5 is used to create a user profile, while the information captured and derived from the processes in FIGS. 6 and 7 is compared with the information in memory 38, to determine whether a person is or is not a user, and then what action to take regarding alarm events for the person.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions and/or acts depicted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, communication may occur in the opposite direction to the depicted arrows.

Computer program code for carrying out operations of the concepts described herein may be written in an object-oriented programming language, such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, all of the accompanying drawings are not to scale. A variety of modifications and variations are possible in light of the above teachings without departing from the scope and spirit of the disclosure.

What is claimed is:

1. A premises device associated with a premises security system for monitoring a premises, the premises device comprising:

a three-dimensional (3D) depth sensor;

a camera; and processing circuitry in communication with the camera and the 3D depth sensor, the processing circuitry configured to:

generate a two-dimensional (2D) template of a face based on an image captured by the camera, the 2D template indicating a facial characteristic associated with the face;

generate a 3D mapping of the facial characteristic using data from the 3D depth sensor;

authenticate a user based on the 2D template and the 3D mapping;

based on authenticating the user, unlock a user interface and enable gesture control of the user interface;

in response to enabling the gesture control of the user interface, detect, using at least one of the camera or the 3D depth sensor, a control gesture;

determine a facial gesture for gesture control based on the control gesture that was detected; and perform a premises security system action in response to the facial gesture, the premises security system action comprising arming the premises security system and causing at least one door to lock.

2. The premises device of claim 1, further comprising a light emitter that projects structured light in a grid or dot matrix format; and wherein processing circuitry is further configured to generate the 3D mapping based on the structed light projected onto the face.

3. The premises device of claim 2, wherein the light emitter is an infrared light emitter.

4. The premises device of claim 1, wherein the processing circuitry is further configured to authenticate a user by comparing the 3D mapping of the face to a stored 3D mapping associated with an authorized user.

5. The premises device of claim 1, wherein the 3D depth sensor is a time- of-flight sensor.

6. The premises device of claim 1, wherein the processing circuitry is further configured to determine the facial characteristic based on pixel information.

7. The premises device of claim 1, wherein the premises device is a control panel of the premises security system.

8. The premises device of claim 1, wherein at least one of the 3D depth sensor or the camera are further configured to rotate.

9. The premises device of claim 1, wherein the processing circuitry is further configured to use at least one of the camera or the 3D depth sensor to detect an environmental event in an environment of the premises device.

10. A method performed in a premises device associated with a premises security system for monitoring a premises, the method comprising:

generating a two-dimensional (2D) template of a face based on an image captured by a camera, the 2D template indicating a facial characteristic associated with the face;

generating a 3D mapping of the facial characteristic using data from a 3D depth sensor;

authenticating a user based on the 2D template and the 3D mapping;

based on authenticating the user, unlocking a user interface and enabling gesture control of the user interface;

in response to enabling the gesture control of the user interface, detecting, using at least one of the camera or the 3D depth sensor, a control gesture;

determining a facial gesture for gesture control based on the control gesture that was detected; and performing a premises security system action in response to the facial gesture, the premises security system action comprising arming the premises security system and causing at least one door to lock.

11. The method of claim 10, further comprising using a light emitter to project structured light, the structured light being in a grid or dot matrix format; and wherein the 3D mapping is generated based on the structed light being projected onto the face.

12. The method of claim 11, wherein the light emitter is an infrared light emitter.

13. The method of claim 10, further comprising authenticating a user by comparing the 3D mapping of the face to a stored 3D mapping associated with an authorized user.

14. The method of claim 10, wherein the 3D depth sensor is a time-of-flight sensor.

15. The method of claim 10, further comprising determining the facial characteristic based on pixel information.

16. The method of claim 10, wherein the premises device is a control panel of the premises security system.

17. The method of claim 10, further comprising rotating at least one of the 3D depth sensor and the camera to capture a wider field of view.

18. The method of claim 10, further comprising using at least one of the camera and the 3D depth sensor to detect an environmental event occurring in an environment of the premises device.

* * * * *